Sept. 16, 1930.  I. F. KINNARD  1,776,153
INDUCTION WATT HOUR METER
Filed Sept. 12, 1929
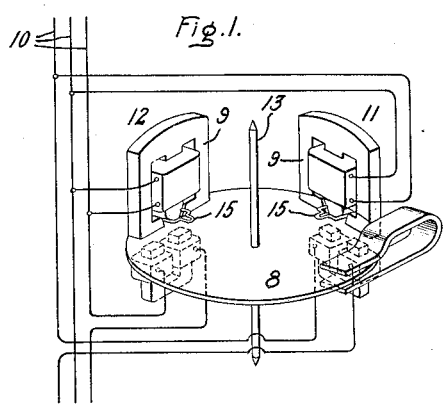
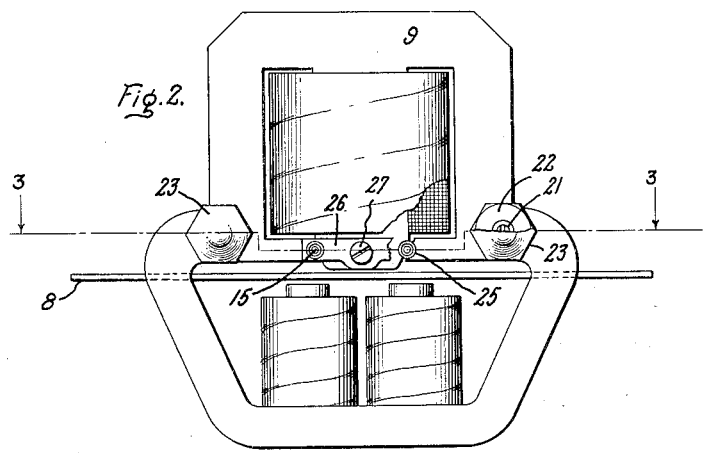
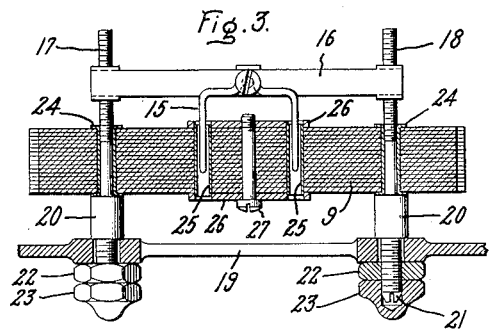
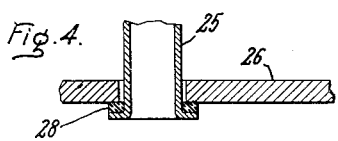
Inventor:
Isaac F. Kinnard
by Charles E. Tullar
His Attorney Patented Sept. 16, 1930

1,776,153

UNITED STATES PATENT OFFICE

ISAAC F. KINNARD, OF LYNNFIELD, MASSACHUSETTS, ASSIGNOR TO GENERAL ELECTRIC COMPANY, A CORPORATION OF NEW YORK

INDUCTION WATT-HOUR METER

Application filed September 12, 1929. Serial No. 392,237.

My invention relates to induction watthour meters or relays and in particular to an auxiliary torque adjusting device of simple construction which is easily applied to the meter so as to be accessible for adjustment.

The invention is particularly useful in polyphase meter elements of the induction type where different induction meter elements are employed to operate on the same shaft or are otherwise mechanically connected together to drive a common register. In such cases it is important that the induction motor torques produced by the torque fluxes of the different meter elements for a given load shall be exactly balanced with respect to each other. My torque adjusting device may be applied to one or more of the meter elements to enable an accurate balance to be obtained in a simple manner. Preferably such adjustment should be accessible from the front of the meter and this is provided for in the modification herein described. The type of induction meter which I have chosen to illustrate as equipped with my adjusting device is provided with an E-shaped voltage magnet having air gaps between the open ends of the E-shaped structure adjacent the rotary disc.

In accordance with the preferred form of my invention I provide small magnetic parts in these air gaps which parts are adjustable in and out of the air gap to vary the proportion of total voltage flux which reaches the disc and produces torque. The parts are supported at the rear of the meter on bolts which extend through the voltage magnet to the front of the meter and the adjustment is made by merely rotating these bolts.

The features of the invention which are believed to be new and patentable will be pointed out in the claims appended hereto. For a better understanding of the invention reference is made in the following description to the accompanying drawing which shows in Fig. 1 a polyphase meter having two induction meter torque elements at least one of which is provided with the torque adjustment feature of my invention to properly balance the torques of the two elements. Fig. 2 is a front view of a meter element having parts broken away to show the position of the torque adjusting device. Fig. 3 is a sectional view of the meter element taken on line 3—3 of Fig. 2; and Fig. 4 is an enlarged view of a structural detail of Fig. 3.

In Fig. 1 I have represented the essential parts of a two-element polyphase integrating watthour meter comprising a rotary disc and stationary voltage and current electromagnets with their energizing windings connected to meter a polyphase circuit 10. Instead of the arrangement shown it is also common practice to provide separate discs for the two torque elements arranged one above the other. Owing to slight irregularities in manufacture it is probable that the torques of the elements 11 and 12 will not be exactly alike when connected to measure equal loads. Since the two rotary elements are connected to drive the same rotary system comprising shaft 13 and disc 8, it is necessary that they both have the same calibration constants; otherwise unbalanced loads would result in erroneous measurements. Both elements may be provided with auxiliary torque adjusting means so as to balance the torques or that element which has the greater torque may be so provided.

In Fig. 1 it is assumed that without any torque adjustment the one element has a slightly greater torque than the other element and is therefore provided with my auxiliary torque adjustment feature represented at 15 and more fully shown in detail in Figs. 2 and 3. This feature consists of a small U-shaped piece of magnetic material, such as iron wire, the ends of which are inserted to a greater or less extent into the air gaps between the open ends of the middle leg and outer legs of the E-shaped voltage magnet 9 adjacent the rotary disc 8. By inserting the fingers of this U-shaped piece of magnetic material into this high reluctance nontorque producing flux path formed by the air gaps the reluctance is lowered and more of the voltage flux is shunted through these gaps and less threads the meter disc and the torque is reduced by a corresponding amount. By adjustment of the part 15 in and out of the air gap the torque of the meter element may be very accurately adjusted, the torque decreasing as the part 15 is moved further into the air gaps. By providing similar shunts for both air gaps of the E-shaped core 9 and equally adjusting them the voltage flux distribution produced by the coil on the middle leg in the disc air gap is not disturbed but merely varied in equal amounts on both sides of the center line of the element. This is important since otherwise the torque adjustment would tend to disturb the desired symmetrical distribution of the voltage flux in the disc air gap. By thus adjustably reducing the torque of one of these elements 12 it may be made exactly similar to that of the other element 11.

By referring to Figs. 2 and 3 it will be seen that the U-shaped magnetic part 15 is carried on a cross piece support 16 having threaded openings parallel to the legs of the U-shaped part 15 and fitting corresponding screw threads on the back ends of bolts 17 and 18. These bolts extend through the laminated meter core parts and a portion of the meter framework 19 so as to be accessible from the front of the meter as ordinarily arranged. The bolts have integral enlarged portions 20 between the core and framework 19 serving to space the parts and to provide a shoulder fitting against the back side of framework 19. The bolts are thus supported for rotational movement but against endwise movement. The front end of the bolts have a slot for inserting a screw driver, as shown at 21 in Fig. 3, by means of which the bolts may be rotated and the cross-piece 16 moved forward or backward to decrease or increase the meter torque. After adjustment, the bolts 17 and 18 are secured against rotation by lock nuts 22 and 23. These bolts are not intended to serve as support bolts between the meter casing and core structure although they may serve this purpose to some extent.

I prefer to insert steel tubes 24 through the core structure where the bolts 17 and 18 pass through. These tubes are flanged at their ends and assist in holding the laminations together and assist in the proper alignment and spacing of the bolts. The air gap spaces where the torque adjusting fingers 15 are inserted are preferably rounded out as represented in Fig. 2 to accommodate tubes 25 of non-magnetic material. These tubes may be of phosphor bronze and are preferably secured in place by non-magnetic cross-pieces 26 and the framelike structure thus formed is securely fixed to the laminations by a bolt 27. This construction assures accurate alignment and prevents the fingers 15 from being drawn to the magnetic core parts. To avoid circulating currents about the framework comprising tubes 25 and cross-pieces 26 I prefer to insulate the tubes 25 from the cross-pieces 26 as represented for example in the detail view shown in Fig. 4 where a fibre washer 28 is inserted between the flared end of the tube 24 and the cross-pieces 26.

While I have made particular reference to induction wattmeter elements I intend to include such induction meter elements as are used for measuring reactive components or for operating relays for example where the invention is equally applicable to adjust the torque. The expression wattmeter element will thus be understood to mean any similar or equivalent induction torque producing element, however used. It will also be evident that the plurality of elements may operate upon separate disc armatures mounted on the same shaft instead of upon the same armature without departing from the inventive thought. These and other modifications which utilize the inventive thought and which do not depart from the principles involved, although they may vary in structural details, are intended to be included within the scope of the appended claims.

What I claim as new and desire to secure by Letters Patent of the United States is:—

1. An induction wattmeter torque element comprising an E-shaped voltage electromagnet, a current electromagnet and an induction disc rotor between the open ends of the E-shaped voltage electromagnet and the current electromagnet, and means for adjusting the torque of said element comprising magnetic members adapted to be adjustably inserted between the open ends of the E-shaped electromagnet.

2. An induction wattmeter element comprising current and voltage electromagnets, an induction disc acted upon by the fluxes of said electromagnets for producing rotation of the disc by induction motor action, said voltage electromagnet having an E-shaped core with its open ends adjacent the disc, a pair of magnetic members adapted to be adjustably inserted into the air gap of the E-shaped core between the open ends thereof from one side of said element, and adjusting means for said magnetic members extending to and accessible from the other side of said element.

3. An induction wattmeter torque element of the type having a rotary disc and an E-shaped voltage electromagnet with its open ends facing the disc, a torque adjusting device comprising a U-shaped magnetic member dimensioned and positioned so that its legs may be adjustably inserted into the air gaps of the E-shaped electromagnet from one side of said element, a support for the U-shaped member provided with threaded openings parallel to the legs of the U-shaped member, bolts threaded into said openings and extending to the opposite side of said element, said bolts being supported for rotational movement and against endwise movement on said element whereby the position of said torque adjusting element may be altered to vary the torque of the element by rotation of said bolts.

In witness whereof, I have hereunto set my hand this ninth day of September, 1929.

ISAAC F. KINNARD.